US011996011B1

(12) United States Patent
Yu

(10) Patent No.: US 11,996,011 B1
(45) Date of Patent: May 28, 2024

(54) SCENE DECORATION PRODUCT

(71) Applicants: Qingxin Yu, Guangdong (CN); Lijiao Zhao, Sichuan (CN)

(72) Inventor: Qingxin Yu, Guangdong (CN)

( * ) Notice: Subject to any disclaimer, the term of this patent is extended or adjusted under 35 U.S.C. 154(b) by 0 days.

(21) Appl. No.: 18/473,980

(22) Filed: Sep. 25, 2023

(30) Foreign Application Priority Data

Sep. 6, 2023 (CN) ......................... 202311148389.X

(51) Int. Cl.
*G09F 13/24* (2006.01)

(52) U.S. Cl.
CPC .................................. *G09F 13/24* (2013.01)

(58) Field of Classification Search
CPC ....................................................... G09F 13/24
See application file for complete search history.

(56) References Cited

U.S. PATENT DOCUMENTS

| | | | | | |
|---|---|---|---|---|---|
| 2,991,574 | A * | 7/1961 | Trame | G09F 13/24 | 40/406 |
| 4,047,633 | A * | 9/1977 | Trombly | B65D 11/16 | 220/592.2 |
| 4,928,412 | A * | 5/1990 | Nishiyama | A63F 7/045 | 40/406 |
| 4,961,276 | A * | 10/1990 | Lin | A63H 13/00 | 428/3 |
| 5,131,175 | A * | 7/1992 | Liu | G09F 19/12 | 40/406 |
| 5,261,848 | A * | 11/1993 | Kaplan | G09F 19/08 | 40/410 |
| 5,291,674 | A * | 3/1994 | Torrence | G09F 19/02 | 40/410 |
| 5,442,869 | A * | 8/1995 | McDarren | G09F 19/08 | 40/406 |
| 6,318,010 | B1 * | 11/2001 | Tsai | G09F 19/08 | 40/406 |
| 6,438,878 | B1 * | 8/2002 | Fine | G09F 19/02 | 40/406 |
| 6,464,078 | B1 * | 10/2002 | Grossnickle | B43M 99/00 | 206/214 |
| 8,695,247 | B1 * | 4/2014 | Yang | G09F 13/32 | 40/406 |
| 8,992,281 | B2 * | 3/2015 | Lui | A63H 3/50 | 446/72 |
| D839,463 | S * | 1/2019 | Fu | F21L 4/00 | D26/94 |

* cited by examiner

*Primary Examiner* — Gary C Hoge

(57) ABSTRACT

The present disclosure provides a scene decoration product. The scene decoration product includes a shell, an inner container and an actuating device. The shell is provided with a first inner side wall and a first outer side wall. The first inner side wall is encircled to form a first accommodating cavity. The first accommodating cavity is provided with a first accommodating opening. The inner container is provided with a second inner side wall and a second outer side wall. The inner container is placed into the first accommodating cavity through the first accommodating opening. An accommodating gap is reserved between the second outer side wall of the inner container and the first inner side wall of the shell. The accommodating gap is configured to accommodate liquid. The actuating device is configured to push water in the accommodating gap to flow.

19 Claims, 11 Drawing Sheets

SCENE DECORATION PRODUCT

CROSS-REFERENCE TO RELATED APPLICATIONS

The application claims priority of Chinese patent application CN202311148389X, filed on Sep. 6, 2023, which is incorporated herein by reference in its entireties.

TECHNICAL FIELD

The present disclosure relates to the field of scene decoration, and in particular, to a scene decoration product.

BACKGROUND

At present, scene decoration products on the market, such as a decorative crystal ball on the current market, would not play a good decoration effect only when a ball body is filled with water. However, the ball body usually needs to be filled with a large amount of water due to a large accommodating space. As a result, the ball body is heavy and inconvenient to carry. Furthermore, it wastes water. Most water injected into the ball body is static, so that the decoration effect is poor. Therefore, there is an urgent need to provide a lightweight scene decoration product with a better decoration effect on the market to improve the user experience.

SUMMARY

In order to overcome the shortcomings of the prior art, the present disclosure provides a scene decoration product, including:

- a shell, wherein the shell is provided with a first inner side wall and a first outer side wall; the first inner side wall is encircled to form a first accommodating cavity; the first accommodating cavity is provided with a first accommodating opening;
- an inner container, wherein the inner container is provided with a second inner side wall and a second outer side wall; the inner container is placed into the first accommodating cavity through the first accommodating opening; an accommodating gap is reserved between the second outer side wall of the inner container and the first inner side wall of the shell; the accommodating gap is configured to accommodate liquid; and
- an actuating device, wherein the actuating device is configured to push water in the accommodating gap to flow.

As the improvement of the present disclosure, the inner container is provided with a second accommodating cavity and a second accommodating opening; the second accommodating opening is communicated with the second accommodating cavity; the second accommodating cavity is formed by encircling the second inner side wall; and the second accommodating cavity is configured to accommodate a decorative object.

As the improvement of the present disclosure, the actuating device includes a driving motor, a first magnetic suction member, and a second magnetic suction member; the second magnetic suction member is arranged in the accommodation gap; the driving motor is provided with a driving output shaft; the first magnetic suction member sleeves the driving output shaft; and when the first magnetic suction member rotates with the driving output shaft, the first magnetic suction member drives the second magnetic suction member arranged in the accommodation gap to rotate, so that the second magnetic suction member pushes the water in the accommodation gap to flow.

As the improvement of the present disclosure, a positioning column is arranged on the first inner side wall, and the second magnetic suction member rotatably sleeves the positioning column, so that the second magnetic suction member rotates around an axial direction of the positioning column.

As the improvement of the present disclosure, a mounting portion extends out of a surface of the first outer side wall; the driving motor is connected to the mounting portion, and the first magnetic suction member sleeving an output shaft of the driving motor is oriented towards the second magnetic suction member, so that the first magnetic suction member drives the second magnetic suction member arranged in the accommodation gap to rotate, and the second magnetic suction member pushes the water in the accommodation gap to flow.

As the improvement of the present disclosure, a covering portion extends out of an upper side of the inner container; the first accommodating opening is communicated with the first accommodating cavity; the inner container is placed into the first accommodating cavity through the first accommodating opening; the upper side of the inner container is connected to an upper side of the shell through the covering portion to cause the covering portion to hermetically cover the accommodating gap. As the improvement of the present disclosure, the inner container is provided with a positioning groove; and the positioning convex block is connected to the positioning groove in an embedded manner.

As the improvement of the present disclosure, a bottom of the inner container is provided with a support leg; and when the inner container is placed into the first accommodating cavity, the support leg supports the bottom of the first inner side wall.

As the improvement of the present disclosure, a water injection port is arranged on the shell or inner container; the water injection port is communicated with the accommodating gap; the water injection port is detachably provided with a sealing plug; and the sealing plug is configured to seal the water injection port.

As the improvement of the present disclosure, the shell is transparent, and the inner container is transparent.

As the improvement of the present disclosure, the scene decoration product further includes a mounting housing and a support base, wherein the mounting housing is connected to the support base; the mounting housing is provided with a third accommodating cavity; the mounting housing is provided with a third accommodating opening on a lower side; the mounting housing is provided with a fourth accommodating opening on an upper side; the third accommodating opening and the fourth accommodating opening are both communicated with the third accommodating cavity; the shell is placed into the third accommodating cavity through the third accommodating opening; and the support base is configured to support a bottom of the shell.

As the improvement of the present disclosure, an upper surface of the support base is supported at the bottom of the shell; a fourth accommodating cavity is formed in a lower surface of the support base in a surrounding manner; the fourth accommodating cavity is provided with a fifth accommodating opening; and the fourth accommodating cavity is configured to accommodate an electronic element.

As the improvement of the present disclosure, several display windows are arranged on a side wall of the mounting housing; and the display windows are configured to display the liquid in the accommodation gap.

As the improvement of the present disclosure, the scene decoration product further includes a bottom cover, wherein the bottom cover is detachably covered at the third accommodating opening; and the bottom cover covers the fifth accommodating opening.

As the improvement of the present disclosure, the scene decoration product further includes a top cover, wherein the top cover is detachably covered at the fourth accommodating opening; and a lower side of the top cover presses against a top of the shell to press the shell onto the upper surface of the support base.

As the improvement of the present disclosure, the scene decoration product further includes a handle, wherein the handle is rotatably connected to the top cover through a first rotating shaft.

As the improvement of the present disclosure, the handle includes a connecting portion and a pull ring; a lower side of the connecting portion is rotatably connected to the top cover through the first rotating shaft; the connecting portion is provided with a mounting hole on an upper side; the pull ring is connected to the mounting hole; and the pull ring rotates in the mounting hole.

As the improvement of the present disclosure, at least one floating decorative object is further arranged in the accommodation gap.

As the improvement of the present disclosure, several first decorative hollows are arranged around a side wall of the mounting housing.

As the improvement of the present disclosure, several second decorative hollows are arranged around a side wall of the top cover.

As the improvement of the present disclosure, the first decorative hollows include at least two kinds of hollow holes with different shapes; and the second decorative hollows include at least two kinds of hollow holes with different shapes.

As the improvement of the present disclosure, the actuating device includes a driving motor and a fan blade; the driving motor is provided with a driving output shaft; the fan blade sleeves the driving output shaft; both the driving motor and the fan blade are located in the accommodation gap; and when the fan blade rotates with the driving output shaft, the fan blade pushes the water in the accommodation gap to flow.

As the improvement of the present disclosure, the actuating device includes a driving motor and a fan blade; the driving motor is provided with a driving output shaft; the fan blade sleeves the driving output shaft; the driving motor is arranged outside the shell; the fan blade is arranged in the accommodation gap; an output shaft of the driving motor passes through the first outer side wall and the first inner side wall of the shell and is connected to the fan blade in the accommodation gap; when the fan blade rotates with the driving output shaft, the fan blade pushes the water in the accommodation gap to flow.

Beneficial effects: the present disclosure provides a scene decoration product. The scene decoration product includes: a shell, wherein the shell is provided with a first inner side wall and a first outer side wall; the first inner side wall is encircled to form a first accommodating cavity; the first accommodating cavity is provided with a first accommodating opening; an inner container, wherein the inner container is provided with a second inner side wall and a second outer side wall; the inner container is placed into the first accommodating cavity through the first accommodating opening; an accommodating gap is reserved between the second outer side wall of the inner container and the first inner side wall of the shell; the accommodating gap is configured to accommodate liquid; and an actuating device, wherein the actuating device is configured to push water in the accommodating gap to flow. Therefore, the water can be injected into the accommodating gap formed between the inner container and the shell, which narrows an accommodating space and reduces a water injection volume, so that the scene decoration product is more lightweight while having a decorative effect. Furthermore, due to the actuating device that pushes the water in the accommodation gap to flow, the water in the accommodation gap can be pushed to form a circulating water flow effect, which has a better effect than a static water decoration scene and has a greater ornamental value.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
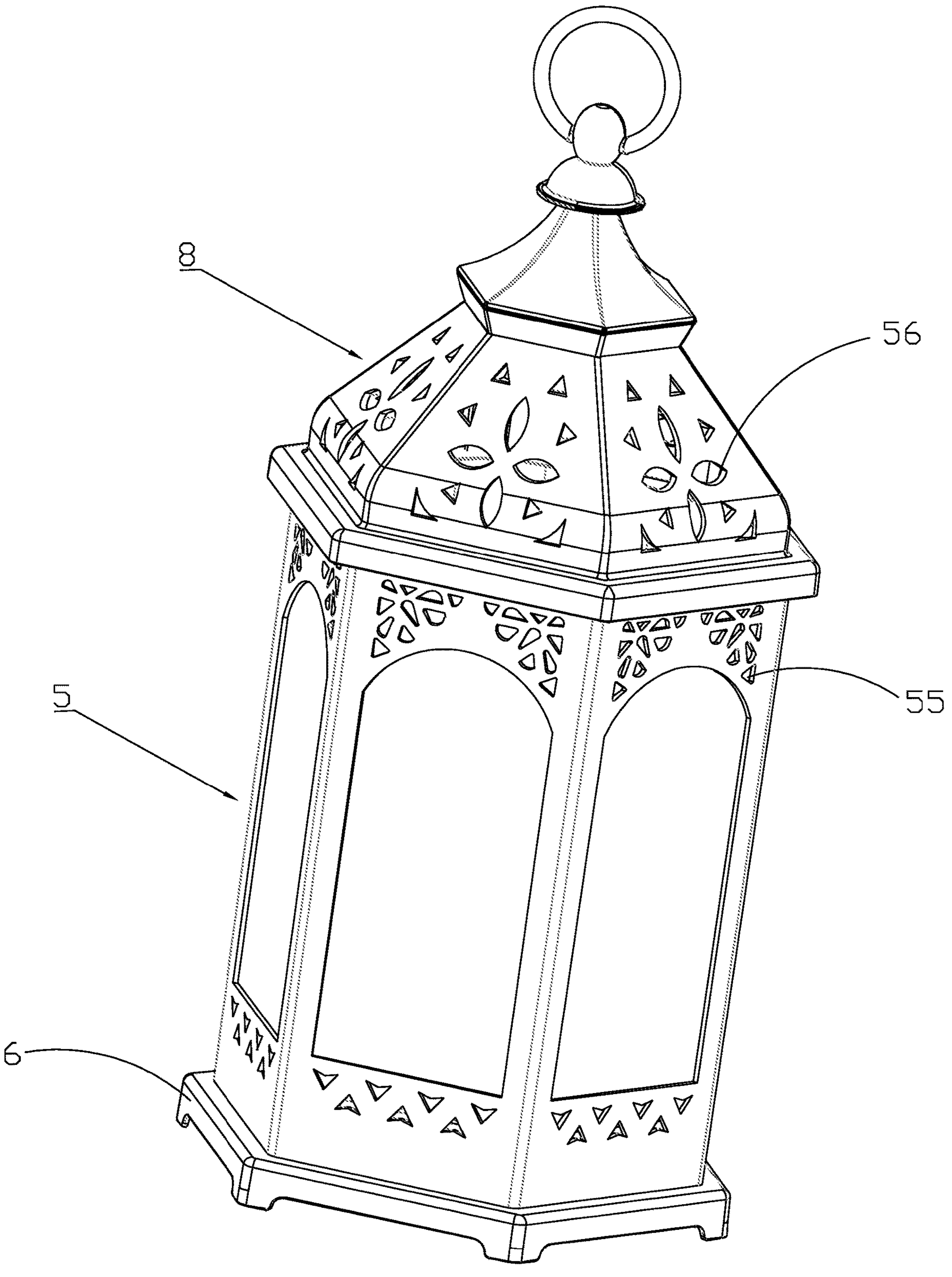
FIG. 1 is a schematic diagram of an entire structure of the present disclosure.
Figure 2:
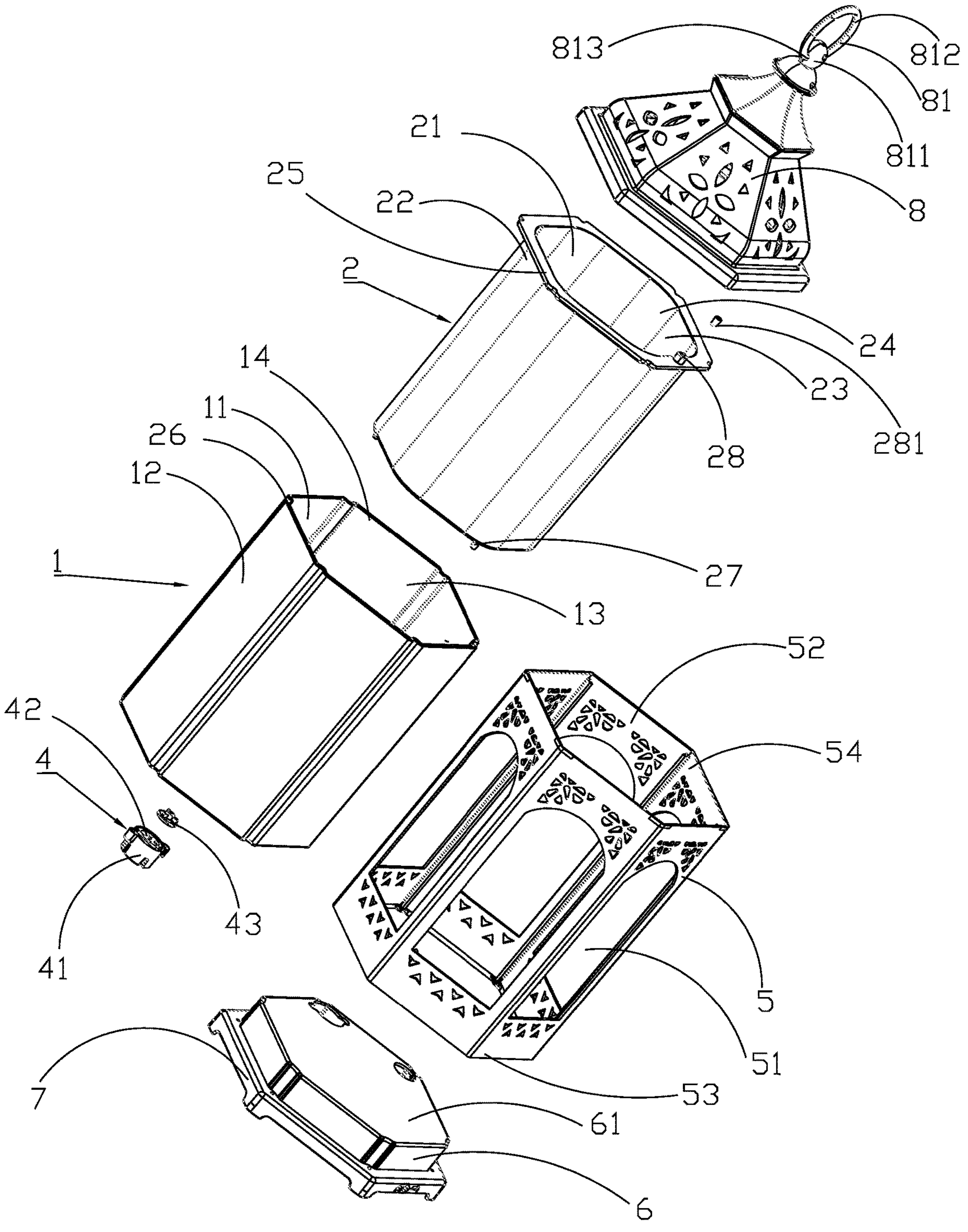
FIG. 2 is an exploded diagram of the present disclosure.
Figure 3:
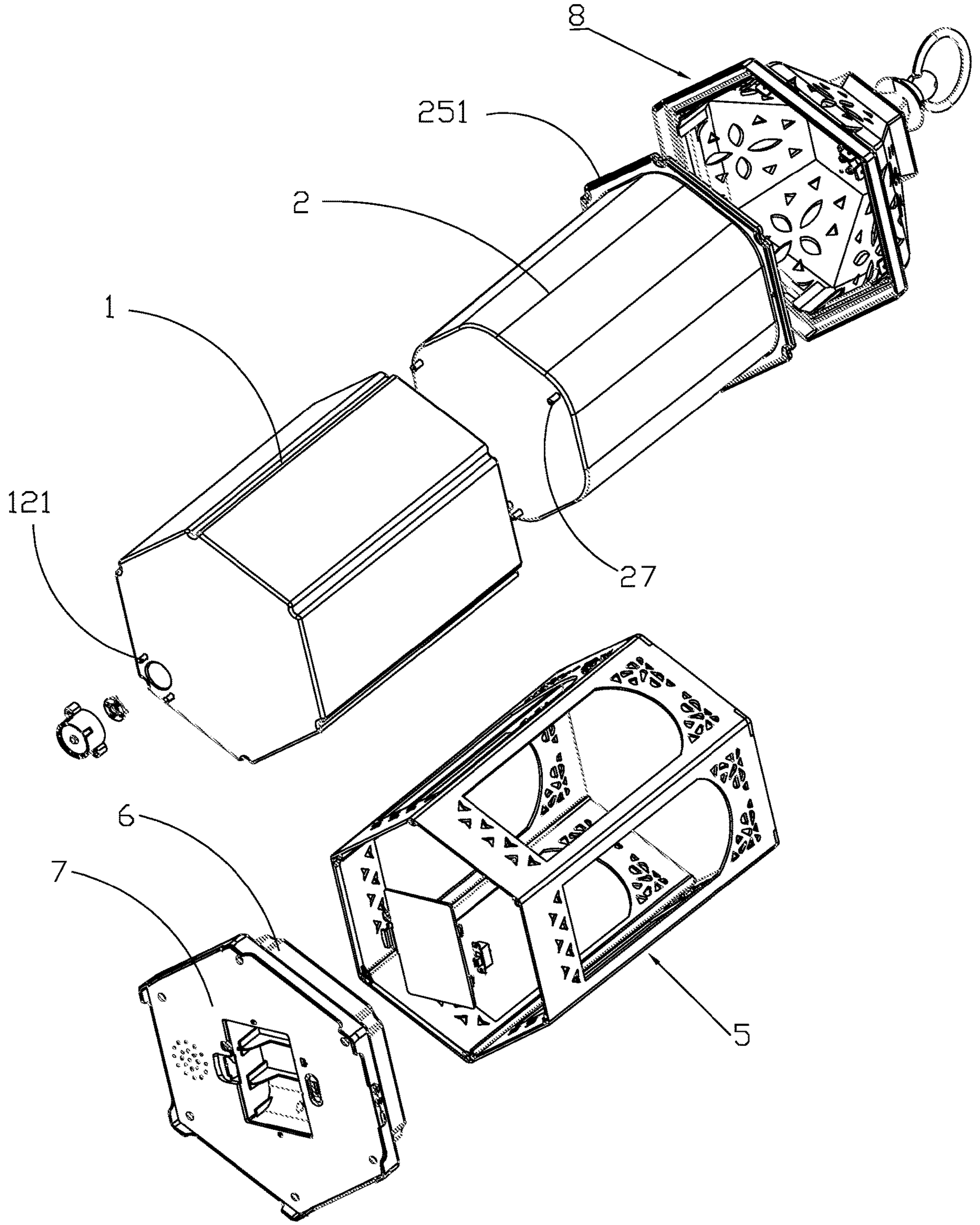
FIG. 3 is another exploded diagram of the present disclosure.
Figure 4:
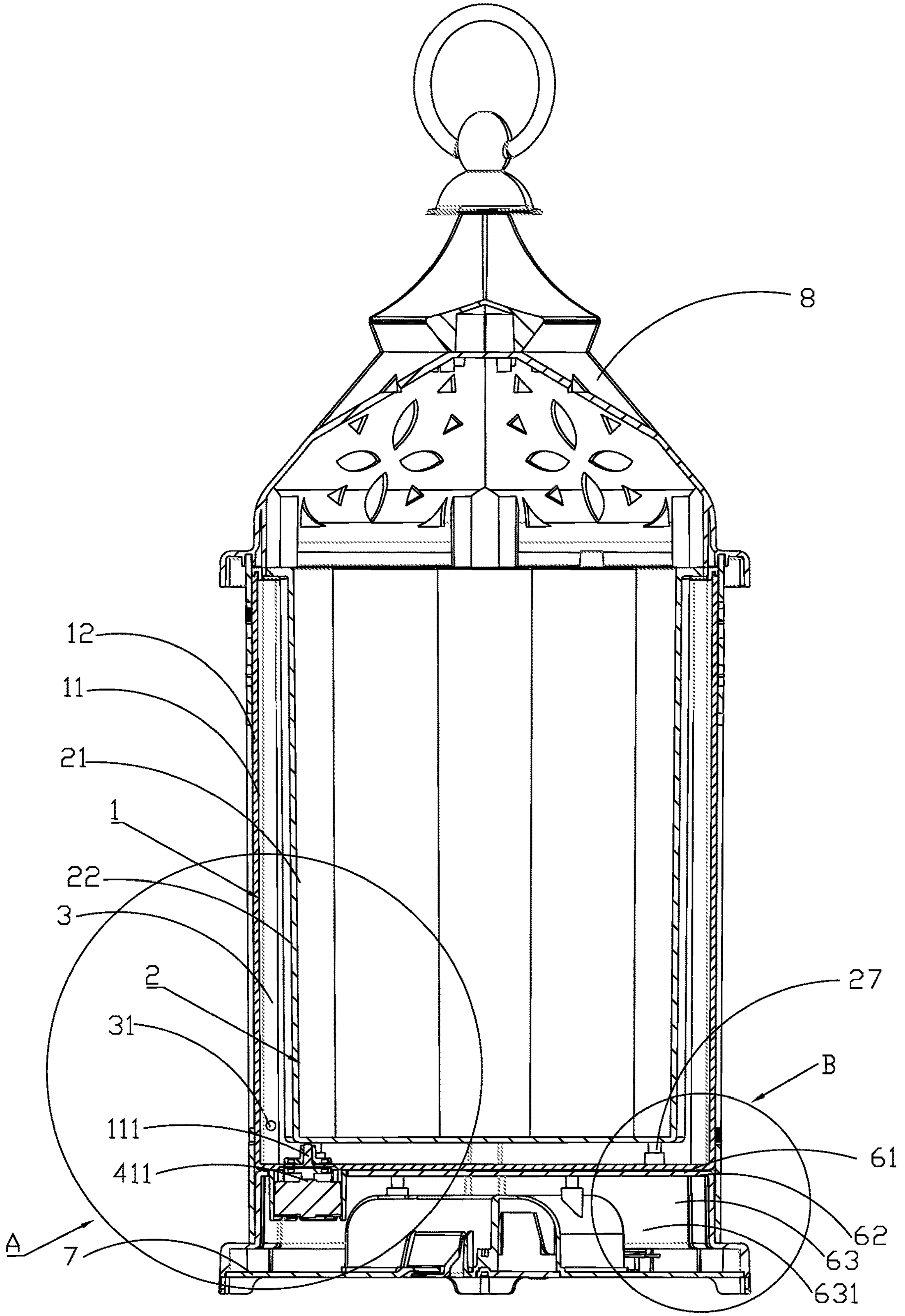
FIG. 4 is a sectional view obtained by sectioning along a shell and an inner container.
Figure 5:
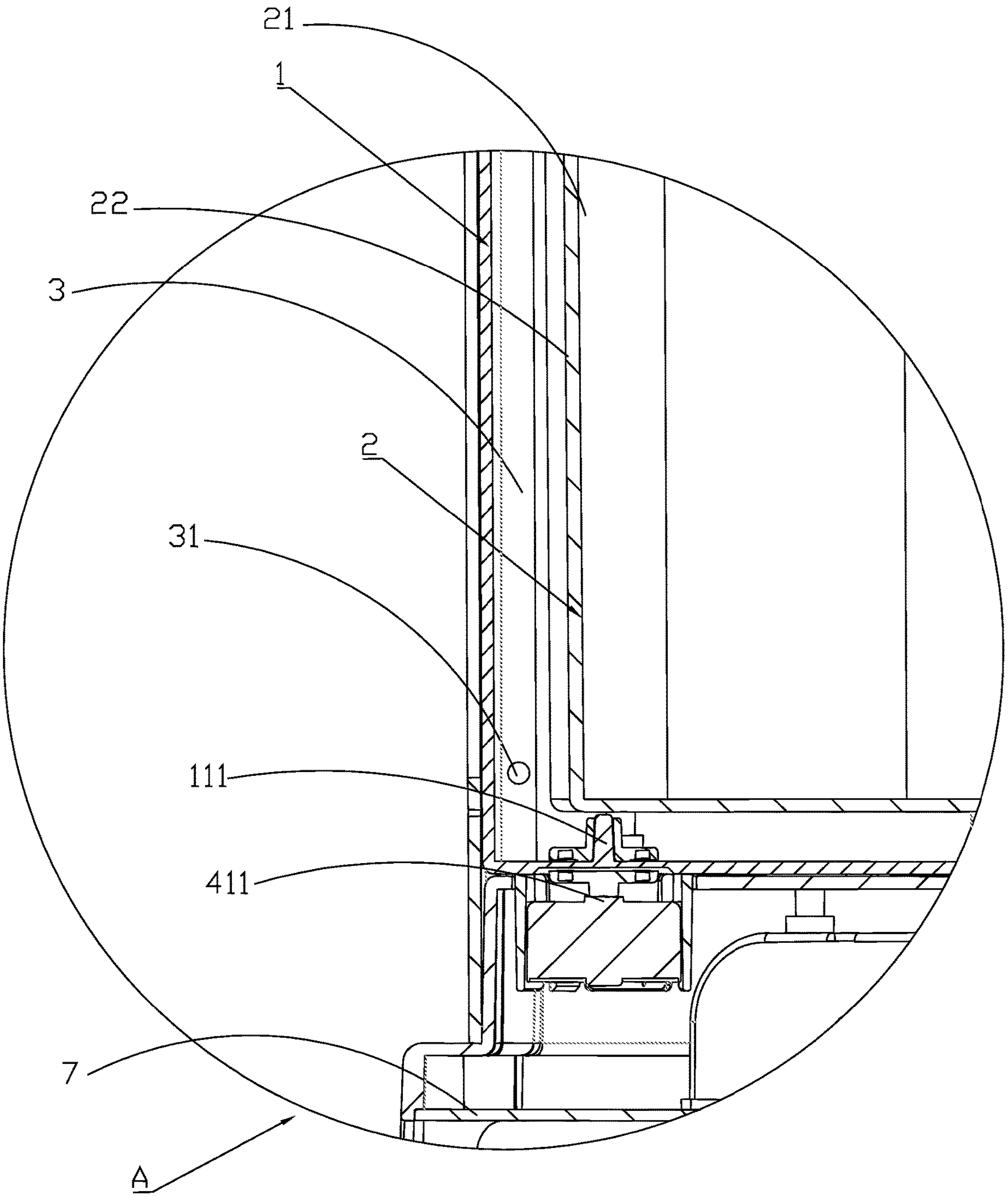
FIG. 5 is an enlarged diagram of the part A of FIG. 4.
Figure 6:
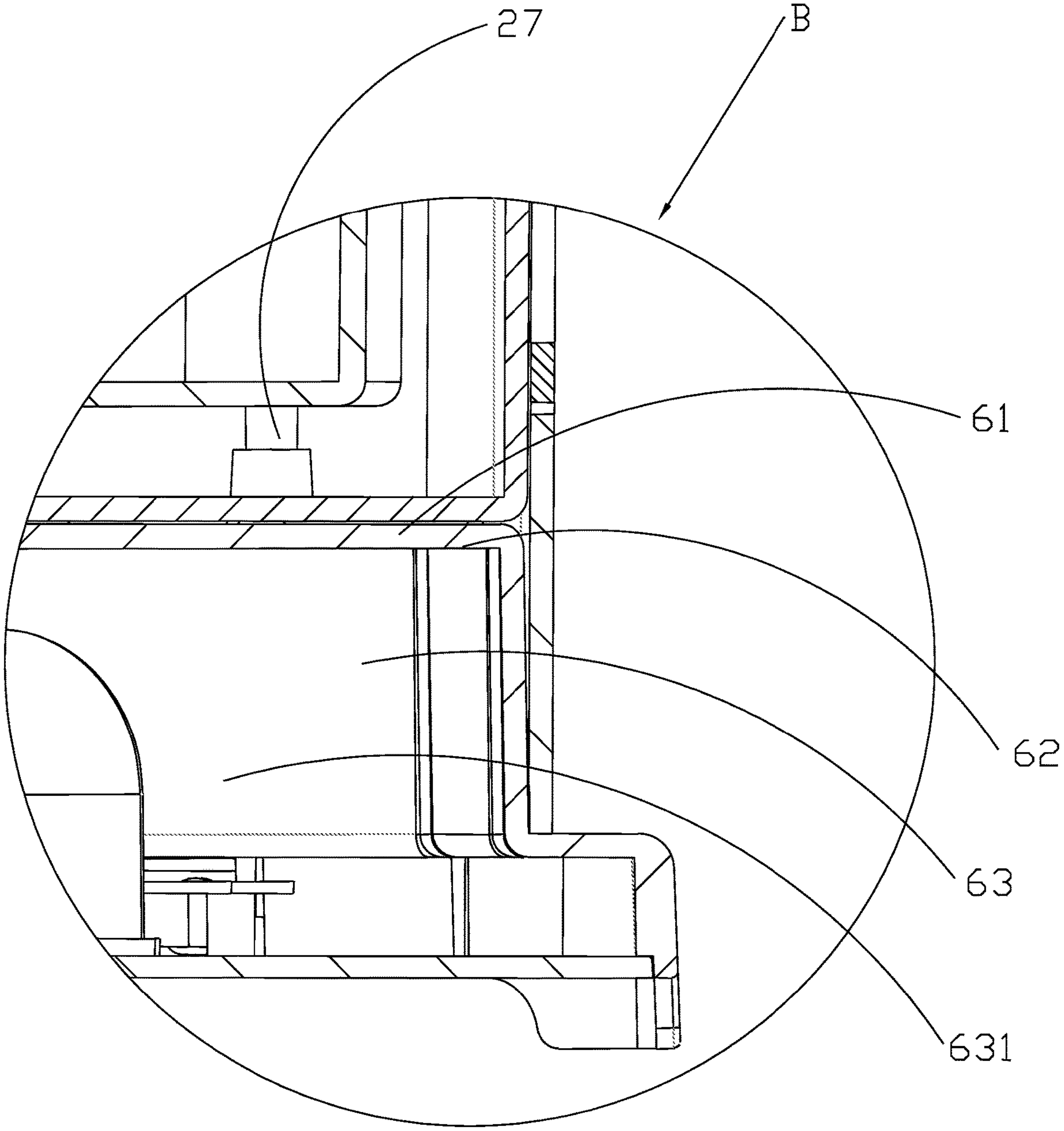
FIG. 6 is an enlarged diagram of the part B of FIG. 4.
Figure 7:
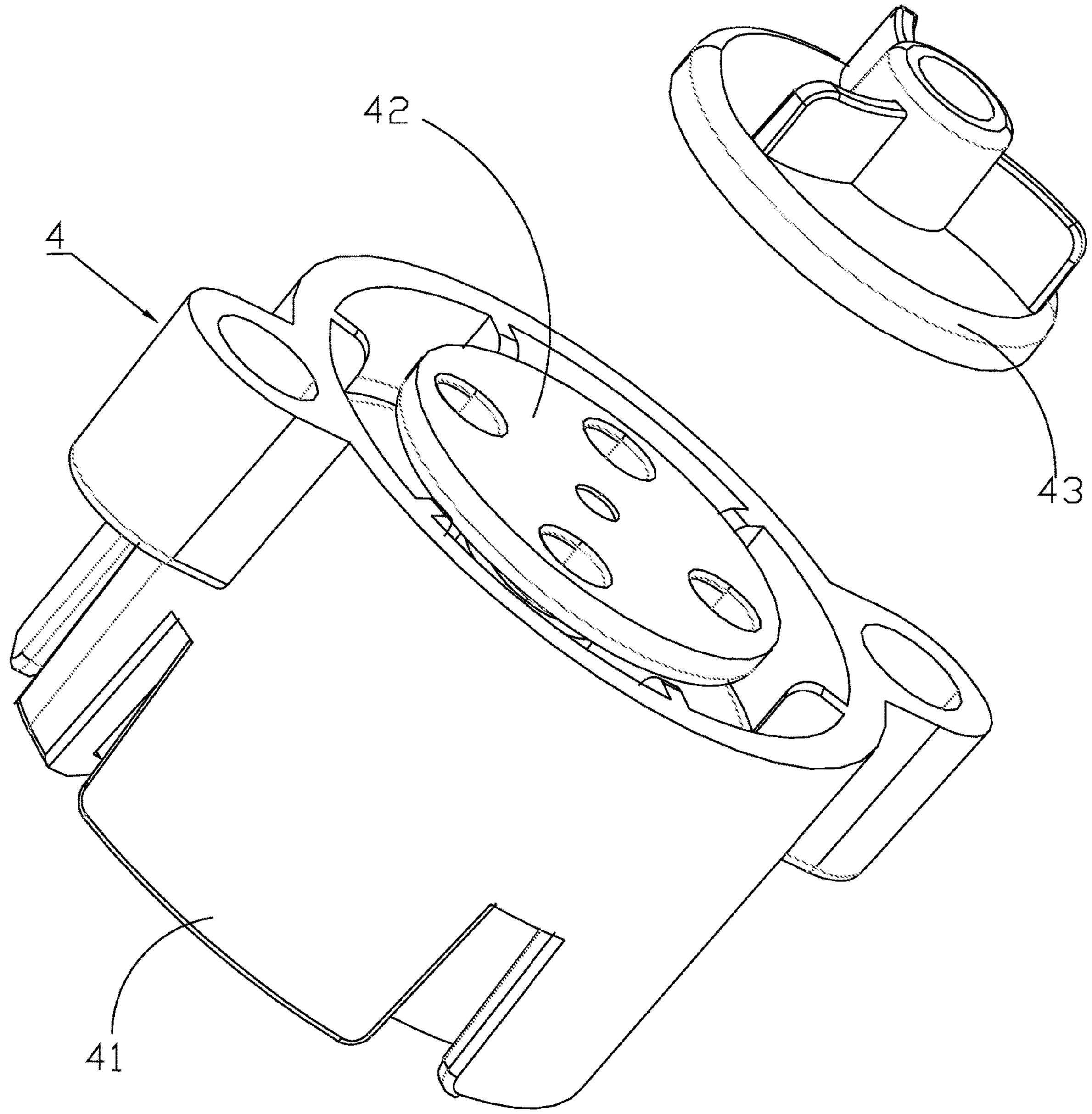
FIG. 7 is a schematic structural diagram of an actuating device.

Referring to FIG. 1 to FIG. 7, a scene decoration product includes:

- a shell 1, wherein the shell 1 is provided with a first inner side wall 11 and a first outer side wall 12; the first inner side wall 11 is encircled to form a first accommodating cavity 13; the first accommodating cavity 13 is provided with a first accommodating opening 14;
- an inner container 2, wherein the inner container 2 is provided with a second inner side wall 21 and a second outer side wall 22; the inner container 2 is placed into the first accommodating cavity 13 through the first accommodating opening 14; an accommodating gap 3 is reserved between the second outer side wall 22 of the inner container 2 and the first inner side wall 11 of the shell 1; the accommodating gap 3 is configured to accommodate liquid; and
- an actuating device 4, wherein the actuating device 4 is configured to push water in the accommodating gap 3 to flow.

Due to the above structure, the scene decoration product includes: a shell 1, wherein the shell 1 is provided with a first inner side wall 11 and a first outer side wall 12; the first inner side wall 11 is encircled to form a first accommodating cavity 13; the first accommodating cavity 13 is provided with a first accommodating opening 14; an inner container 2, wherein the inner container 2 is provided with a second inner side wall 21 and a second outer side wall 22; the inner container 2 is placed into the first accommodating cavity 13 through the first accommodating opening 14; an accommodating gap 3 is reserved between the second outer side wall 22 of the inner container 2 and the first inner side wall 11 of the shell 1; the accommodating gap 3 is configured to accommodate liquid; and an actuating device 4, wherein the actuating device 4 is configured to push water in the accommodating gap 3 to flow. Therefore, the water can be injected into the accommodating gap 3 formed between the inner container 2 and the shell 1, which narrows an accommodating space and reduces a water injection volume, so that the scene decoration product is more lightweight while having a decorative effect. Furthermore, due to the actuating device 4 that pushes the water in the accommodation gap 3 to flow, the water in the accommodation gap 3 can be pushed to form a circulating water flow effect, which has a better effect than a static water decoration scene and has a greater ornamental value.

At least one floating decorative object 31 is further arranged in the accommodation gap 3. Specifically, the floating decorative object 31 is a decorative glitter. Due to the above structure, because of the actuating device 4 that pushes the water in the accommodation gap 3 to flow, the water in the accommodation gap 3 can be pushed to form a circulating water flow effect. The decorative glitter flows with the circulating water flow, which further improves the ornamental value of the scene decoration product.

In this embodiment, the inner container 2 is provided with a second accommodating cavity 23 and a second accommodating opening 24. The second accommodating opening 24 is communicated with the second accommodating cavity 23. The second accommodating cavity 23 is formed by encircling the second inner side wall 21. The second accommodating cavity 23 is configured to accommodate a decorative object. The decorative object may be a Christmas tree, or may be a retro train, an automobile, or the like. Due to the above structure, the water in the accommodation gap 3 can be pushed to form a circulating water flow effect. The dynamic circulating water flow and the decorative object in the inner container 2 are combined to form a unique scene, which further improves the ornamental value.

In this embodiment, the actuating device 4 includes a driving motor 41, a first magnetic suction member 42, and a second magnetic suction member 43. The second magnetic suction member 43 is arranged in the accommodation gap 3. The driving motor 41 is provided with a driving output shaft 411. The first magnetic suction member 42 sleeves the driving output shaft 411. When the first magnetic suction member 42 rotates with the driving output shaft 411, the first magnetic suction member 42 drives the second magnetic suction member 43 arranged in the accommodation gap 3 to rotate, so that the second magnetic suction member 43 pushes the water in the accommodation gap 3 to flow. A positioning column 111 is arranged on the first inner side wall 11, and the second magnetic suction member 43 rotatably sleeves the positioning column 111, so that the second magnetic suction member 43 rotates around an axial direction of the positioning column 111. Specifically, a mounting portion 121 extends out of a surface of the first outer side wall 12. The driving motor 41 is connected to the mounting portion 121, and the first magnetic suction member 42 sleeving an output shaft of the driving motor 41 is oriented towards the second magnetic suction member 43, so that the first magnetic suction member 42 can drive the second magnetic suction member 43 arranged in the accommodation gap 3 to rotate, and the second magnetic suction member 43 pushes the water in the accommodation gap 3 to flow. Due to the above structure, the arrangement of the actuating device 4 is effectively achieved. Furthermore, the first magnetic suction ember 42 rotates to drive the second magnetic suction ember 43 to rotate, which can avoid direct contact between the driving motor 41 as well as a motor output shaft and the water in the accommodating gap 3 and can effectively prevent a short circuit caused by water seepage in the driving motor 41, so that the service life of the driving motor 41 is prolonged, and the working stability of the driving motor is improved. Further, the first magnetic suction member is a magnetic ring, and the second magnetic suction member is a fan-blade-shaped second magnetic suction member.

In this embodiment, a covering portion 25 extends out of an upper side of the inner container 2. The first accommodating opening 14 is communicated with the first accommodating cavity 13. The inner container 2 is placed into the first accommodating cavity 13 through the first accommodating opening 14. The upper side of the inner container 2 is connected to an upper side of the shell 1 through the covering portion 25 to cause the covering portion 25 to hermetically cover the accommodating gap 3. The shell 1 is provided with a positioning convex block 26. The covering portion 25 is provided with a positioning groove 251. The positioning convex block 26 is connected to the positioning groove 251 in an embedded manner. Due to the above structure, sealing of the accommodating gap 3 by the covering portion 25 is effectively achieved, which prevents the water in the accommodating gap 3 from overflowing, and can particularly prevent the phenomenon that the actuating device 4 pushes the water in the accommodating gap 3 to form dynamic circulating water flow and causes the water to overflow.

In this embodiment, a bottom of the inner container 2 is provided with a support leg 27. When the inner container 2 is placed into the first accommodating cavity 13, the support leg 27 supports the bottom of the first inner side wall 11. Due to the above structure, assembling between the inner container 2 and the shell 1 is effectively achieved. In addition, the support leg 27 supports the bottom of the first inner side wall 11, so that the accommodating gap 3 for accommodating the liquid is reserved between the bottom of the inner container 2 and a bottom of the shell 1.

In this embodiment, a water injection port 28 is arranged on the shell 1 or inner container 2. The water injection port 28 is communicated with the accommodating gap 3. The water injection port 28 is detachably provided with a sealing plug 281. The sealing plug 281 is configured to seal the water injection port 28. Due to the above structure, it is convenient for a user to inject the water into the accommodating gap 3 via the water injection port 28, so that it is convenient to add or replace the water in the accommodating gap 3.

In this embodiment, the shell 1 is transparent, and the inner container 2 is transparent. Due to the above structure, it is convenient for the user to observe, through the shell 1, the liquid cyclically flowing in the accommodating gap 3, and it is also convenient for the user to observe the decorative object in the inner container 2 through the shell 1 and the inner container 2, so as to improve the ornamental value of the scene decoration product.

In this embodiment, the scene decoration product further includes a mounting housing 5 and a support base 6. The mounting housing 5 is connected to the support base 6. The mounting housing 5 is provided with a third accommodating cavity 52. The mounting housing 5 is provided with a third accommodating opening 53 on a lower side. The mounting housing 5 is provided with a fourth accommodating opening 54 on an upper side. The third accommodating opening 53 and the fourth accommodating opening 54 are both communicated with the third accommodating cavity 52. The shell 1 is placed into the third accommodating cavity 52 through the third accommodating opening 53. The support base 6 is configured to support the bottom of the shell 1. An upper surface 61 of the support base 6 is supported at the bottom of the shell 1. A fourth accommodating cavity 63 is formed in a lower surface 62 of the support base 6 in a surrounding manner. The fourth accommodating cavity 63 is provided with a fifth accommodating opening 631. The fourth accommodating cavity 63 is configured to accommodate an electronic element. Specifically, several display windows 51 are arranged on a side wall of the mounting housing 5. The display windows 51 are configured to display the liquid in the accommodation gap 3. Further, the scene decoration product further includes a bottom cover 7. The bottom cover 7 is detachably covered at the third accommodating opening 53. The bottom cover 7 covers the fifth accommodating opening 631. Further, the scene decoration product further includes a top cover 8. The top cover 8 is detachably covered at the fourth accommodating opening 54. A lower side of the top cover 8 presses against a top of the shell 1 to press the shell 1 onto the upper surface 61 of the support base 6. Due to the above structure, the scene decoration product has a reasonable design, a simple structure, and stable and compact connection, and the arrangement of the shell 1, the inner container 2, the mounting housing 5, and the support base 6 is effectively achieved.

In this embodiment, the scene decoration product further includes a handle 81. The handle 81 is rotatably connected to the top cover 8 through a first rotating shaft 82. The handle 81 includes a connecting portion 811 and a pull ring 812. A lower side of the connecting portion 811 is rotatably connected to the top cover 8 through the first rotating shaft 82. The connecting portion 811 is provided with a mounting hole 813 on an upper side. The pull ring 812 is connected to the mounting hole 813. The pull ring 812 can rotate in the mounting hole 813. Due to the above structure, the user can conveniently carry the scene decoration product using the handle 81, and it is convenient for the user to carry and move the scene decoration product.

In this embodiment, several first decorative hollows 55 are arranged around a side wall of the mounting housing 5. Several second decorative hollows 56 are arranged around a side wall of the top cover 8. Specifically, the first decorative hollows 55 include at least two kinds of hollow holes with different shapes; and the second decorative hollows 56 include at least two kinds of hollow holes with different shapes.

Figure 8:
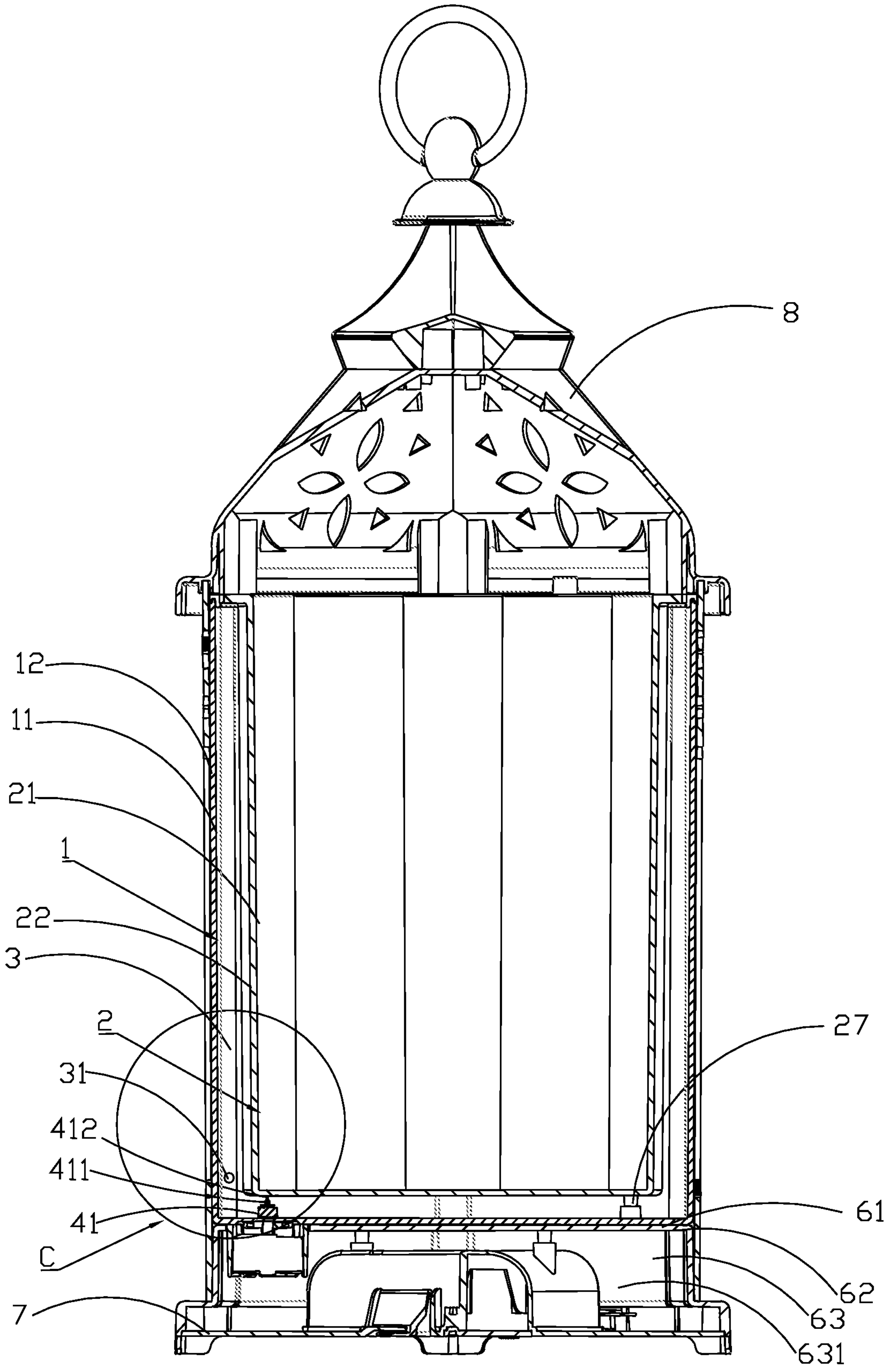
FIG. 8 is another schematic structural diagram of an actuating device.
Figure 9:
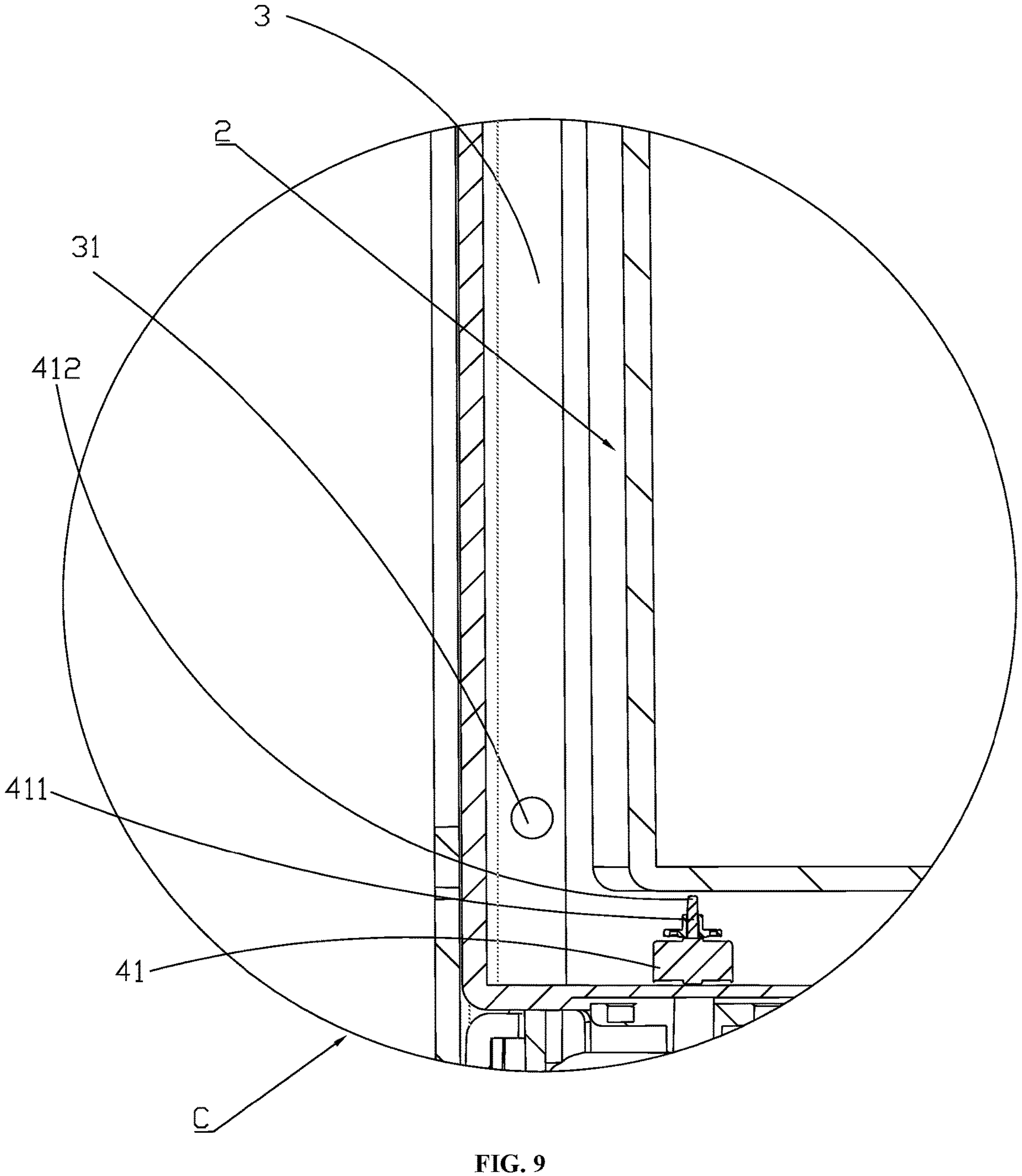
FIG. 9 is an enlarged diagram of the part C of FIG. 8.

Referring to FIG. 8 to FIG. 9, in some embodiments, the actuating device can also be set as follows: The actuating device 4 includes a driving motor 41 and a fan blade 412. The driving motor 41 is provided with a driving output shaft 411. The fan blade sleeves the driving output shaft 411. Both the driving motor and the fan blade are located in the accommodation gap. When the fan blade 412 rotates with the driving output shaft 411, the fan blade 412 pushes the water in the accommodation gap 3 to flow.

Figure 10:
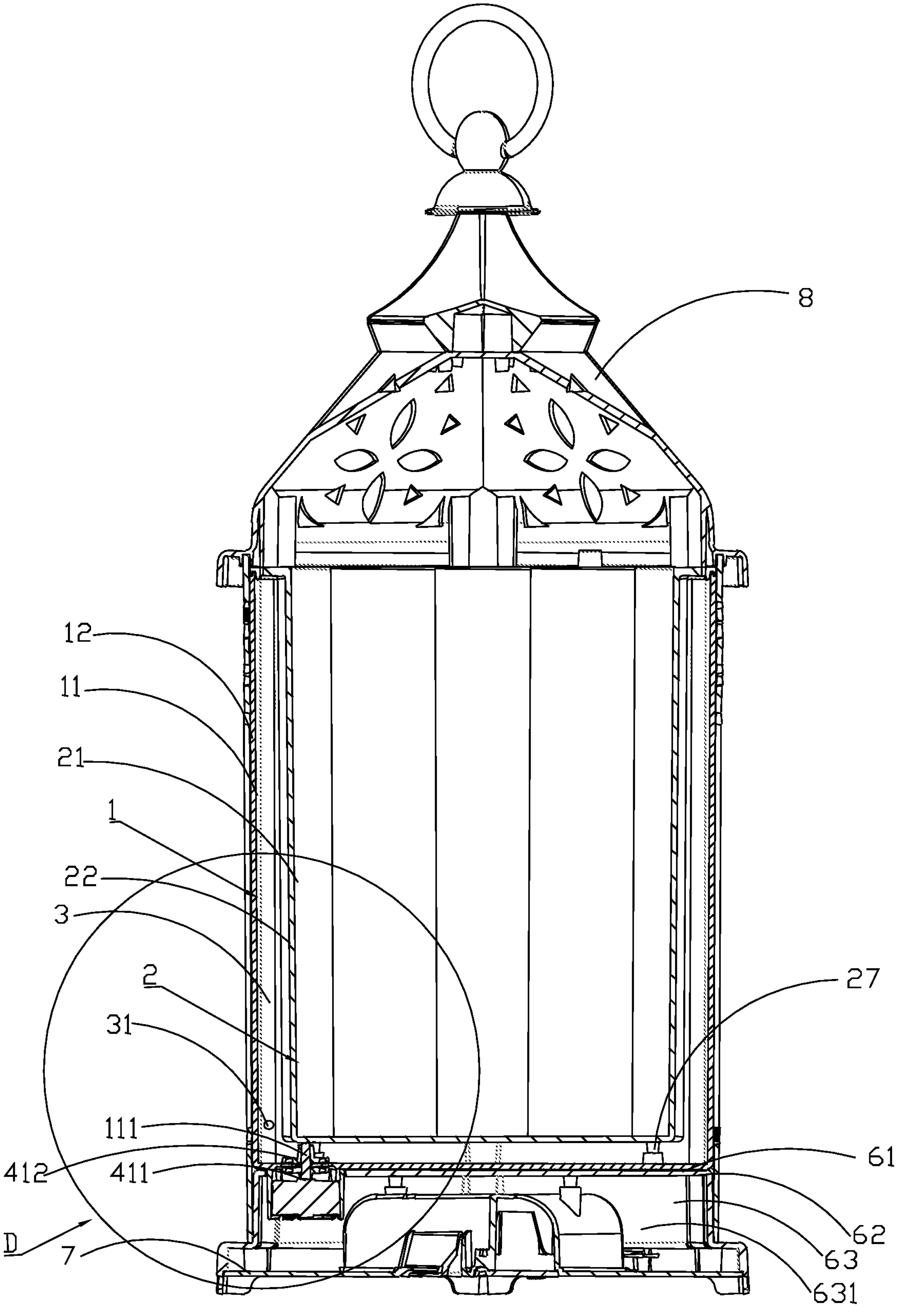
FIG. 10 is still another schematic structural diagram of an actuating device.
Figure 11:
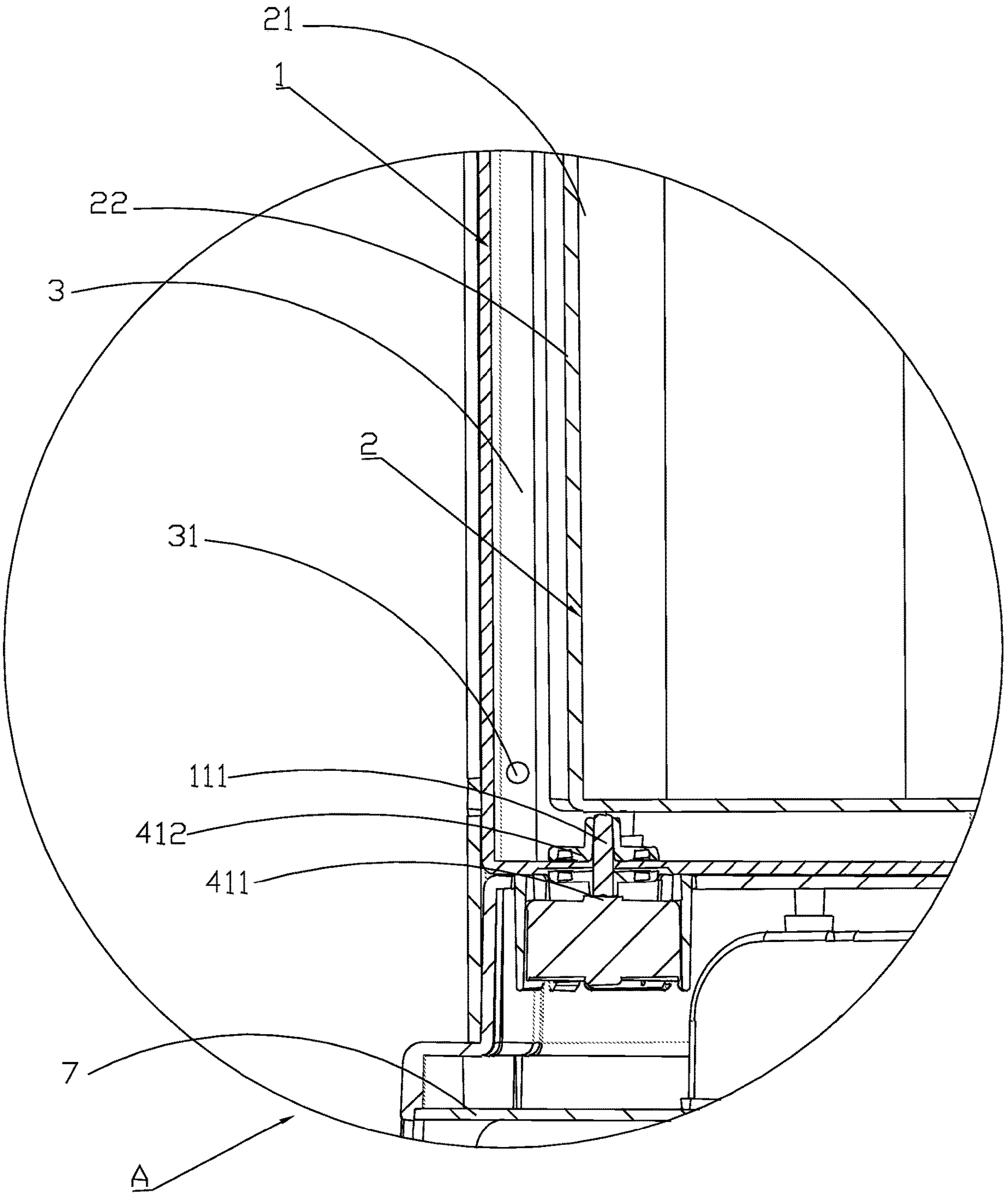
FIG. 11 is an enlarged diagram of the part D of FIG. 10.

Referring to FIG. 10 to FIG. 11, in some embodiments, the actuating device can also be set as follows: The actuating device 4 includes a driving motor 41 and a fan blade 412. The driving motor 41 is provided with a driving output shaft 411. The fan blade 412 sleeves the driving output shaft 411. The driving motor 41 is arranged outside the shell 1. The fan blade is arranged in the accommodation gap. An output shaft of the driving motor passes through the first outer side wall and the first inner side wall of the shell and is connected to the fan blade in the accommodation gap. When the fan blade 412 rotates with the driving output shaft 411, the fan blade 412 pushes the water in the accommodation gap 3 to flow.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A scene decoration product, comprising:

a shell, wherein the shell is provided with a first inner side wall and a first outer side wall; the first inner side wall is encircled to form a first accommodating cavity; the first accommodating cavity is provided with a first accommodating opening;

an inner container, wherein the inner container is provided with a second inner side wall and a second outer side wall; the inner container is placed into the first accommodating cavity through the first accommodating opening; an accommodating gap is reserved between the second outer side wall of the inner container and the first inner side wall of the shell; the accommodating gap is configured to accommodate liquid; and an actuating device, wherein the actuating device is configured to push the liquid in the accommodating gap to flow;

wherein a covering portion extends out of an upper side of the inner container; the first accommodating opening is communicated with the first accommodating cavity; the inner container is placed into the first accommodating cavity through the first accommodating opening; the upper side of the inner container is connected to an upper side of the shell through the covering portion to cause the covering portion to hermetically cover the accommodating gap; the shell is provided with a positioning convex block; the covering portion is provided with a positioning groove; and the positioning convex block is connected to the positioning groove in an embedded manner.

2. The scene decoration product according to claim 1, wherein the inner container is provided with a second accommodating cavity and a second accommodating opening; the second accommodating opening is communicated with the second accommodating cavity; the second accommodating cavity is formed by encircling the second inner side wall; and the second accommodating cavity is configured to accommodate a decorative object.

3. The scene decoration product according to claim 1, wherein the actuating device comprises a driving motor, a first magnetic suction member, and a second magnetic suction member; the second magnetic suction member is arranged in the accommodation gap; the driving motor is provided with a driving output shaft; the first magnetic suction member sleeves the driving output shaft; and when the first magnetic suction member rotates with the driving output shaft, the first magnetic suction member drives the second magnetic suction member arranged in the accommodation gap to rotate, so that the second magnetic suction member pushes the liquid in the accommodation gap to flow.

4. The scene decoration product according to claim 3, wherein a positioning column is arranged on the first inner side wall, and the second magnetic suction member rotatably sleeves the positioning column, so that the second magnetic suction member rotates around an axial direction of the positioning column.

5. The scene decoration product according to claim 3, wherein a mounting portion extends out of a surface of the first outer side wall; the driving motor is connected to the mounting portion, and the first magnetic suction member sleeving an output shaft of the driving motor is oriented towards the second magnetic suction member, so that the first magnetic suction member drives the second magnetic suction member arranged in the accommodation gap to rotate, and the second magnetic suction member pushes the liquid in the accommodation gap to flow.

6. The scene decoration product according to claim 1, wherein the actuating device comprises a driving motor and a fan blade; the driving motor is provided with a driving output shaft; the fan blade sleeves the driving output shaft; both the driving motor and the fan blade are located in the accommodation gap; and when the fan blade rotates with the driving output shaft, the fan blade pushes the liquid in the accommodation gap to flow.

7. The scene decoration product according to claim 1, wherein the actuating device comprises a driving motor and a fan blade; the driving motor is provided with a driving output shaft; the fan blade sleeves the driving output shaft; the driving motor is arranged outside the shell; the fan blade is arranged in the accommodation gap; an output shaft of the driving motor passes through the first outer side wall and the first inner side wall of the shell and is connected to the fan blade in the accommodation gap; when the fan blade rotates with the driving output shaft, the fan blade pushes the liquid in the accommodation gap to flow; the shell is transparent; and the inner container is transparent.

8. The scene decoration product according to claim 1, wherein a liquid injection port is arranged on the shell or inner container; the liquid injection port is communicated with the accommodating gap; the liquid injection port is detachably provided with a sealing plug; and the sealing plug is configured to seal the liquid injection port.

9. A scene decoration product, comprising:

a shell, wherein the shell is provided with a first inner side wall and a first outer side wall; the first inner side wall is encircled to form a first accommodating cavity; the first accommodating cavity is provided with a first accommodating opening;

an inner container, wherein the inner container is provided with a second inner side wall and a second outer side wall; the inner container is placed into the first accommodating cavity through the first accommodating opening; an accommodating gap is reserved between the second outer side wall of the inner container and the first inner side wall of the shell; the accommodating gap is configured to accommodate liquid; and an actuating device, wherein the actuating device is configured to push the liquid in the accommodating gap to flow;

wherein a bottom of the inner container is provided with a support leg; and when the inner container is placed into the first accommodating cavity, the support leg supports the bottom of the first inner side wall.

10. A scene decoration product, comprising:

a shell, wherein the shell is provided with a first inner side wall and a first outer side wall; the first inner side wall is encircled to form a first accommodating cavity; the first accommodating cavity is provided with a first accommodating opening;

an inner container, wherein the inner container is provided with a second inner side wall and a second outer side wall; the inner container is placed into the first accommodating cavity through the first accommodating opening; an accommodating gap is reserved between the second outer side wall of the inner container and the first inner side wall of the shell; the accommodating gap is configured to accommodate liquid; and an actuating device, wherein the actuating device is configured to push the liquid in the accommodating gap to flow;

the scene decoration product further comprising a mounting housing and a support base, wherein the mounting housing is connected to the support base; the mounting housing is provided with a third accommodating cavity; the mounting housing is provided with a third accommodating opening on a lower side; the mounting housing is provided with a fourth accommodating opening on an upper side; the third accommodating opening and the fourth accommodating opening are both communicated with the third accommodating cavity; the shell is placed into the third accommodating cavity through the third accommodating opening; and the support base is configured to support a bottom of the shell.

11. The scene decoration product according to claim 10, wherein an upper surface of the support base is supported at the bottom of the shell; a fourth accommodating cavity is formed in a lower surface of the support base in a surrounding manner; the fourth accommodating cavity is provided with a fifth accommodating opening; and the fourth accommodating cavity is configured to accommodate an electronic element.

12. The scene decoration product according to claim 11, further comprising a bottom cover, wherein the bottom cover is detachably covered at the third accommodating opening; and the bottom cover covers the fifth accommodating opening.

13. The scene decoration product according to claim 10, wherein several display windows are arranged on a side wall of the mounting housing; and the display windows are configured to display the liquid in the accommodation gap.

14. The scene decoration product according to claim 10, further comprising a top cover, wherein the top cover is detachably covered at the fourth accommodating opening; and a lower side of the top cover presses against a top of the shell to press the shell onto the upper surface of the support base.

15. The scene decoration product according to claim 14, further comprising a handle, wherein the handle is rotatably connected to the top cover through a first rotating shaft.

16. The scene decoration product according to claim 15, wherein the handle comprises a connecting portion and a pull ring; a lower side of the connecting portion is rotatably connected to the top cover through the first rotating shaft; the connecting portion is provided with a mounting hole on an upper side; the pull ring is connected to the mounting hole; and the pull ring rotates in the mounting hole.

17. The scene decoration product according to claim 15, wherein at least one floating decorative object is further arranged in the accommodation gap.

18. The scene decoration product according to claim 14, wherein several first decorative hollows are arranged around a side wall of the mounting housing, and several second decorative hollows are arranged around a side wall of the top cover.

19. The scene decoration product according to claim 18, wherein the first decorative hollows comprise at least two kinds of hollow holes with different shapes; and the second decorative hollows comprise at least two kinds of hollow holes with different shapes.

* * * * *